United States Patent Office 3,337,506
Patented Aug. 22, 1967

3,337,506
PROCESS FOR THE MANUFACTURE OF POLY-
FORMALDEHYDE USING AN ORGANOAMI-
NOSILANE AS CATALYST
Francois Meiller, Palaiseau, France, assignor to Produits
Chimiques Pechiney Saint-Gobain, Neuilly-sur-Seine,
France
No Drawing. Filed Jan. 28, 1964, Ser. No. 340,814
Claims priority, application France, Jan. 29, 1963,
922,990
14 Claims. (Cl. 260—67)

This invention relates to the manufacture of polyformaldehyde by catalysis of the monomer and to superior polymers of formaldehyde.

It is known to catalyze the polymerization of formaldehyde in liquid phase or in vapor phase by a variety of catalysts among which there have been amines such as teritary amines, phosphines, organic peroxides and quaternary ammonium salts, but the polymers thus obtained have a range of molecular weights which is extensive, some of these weights being insufficient and, in many instances, making the products brittle. Furthermore, the stabilization of these polymers is often difficult.

It is an object of the present invention to polymerize formaldehyde and to produce easily stabilized polymers of high molecular weight. It comprises the use as catalyst of a group of compounds which contain silicon and amino groups in their molecules. In this case the word "amine" includes the imines.

The objects of the invention are accomplished, generally speaking, by the method of polymerizing formaldehyde which comprises bringing anhydrous formaldehyde into contact with a catalytic quantity of an organo-aminosilane, in which the organo group is either aryl or alkyl, is preferably a hydrocarbon radical, but may be a halogenated hydrocarbon radical. These catalysts may also contain in their molecular structure other atoms such as oxygen, sulfur, alkyl and aryl, examples of which are the alkyl-, or aryl-, or cycloaryl aminosilanes; the alkoxy-, or aryloxy-, or cycloaryloxy-aminosilanes; the alkylthio-, or arylthio-, or cycloarylthio-aminosilanes; the alkyl- or aryl-iminosilanes; the polyalkylpolyaminosilanes; the polycycloarylpolyaminosilanes; and the silanes substituted by one or more heterocyclic nitrogens as well as their halogenated derivatives. The hetero atoms and substituent groups may appear in the catalyst either individually or in combinations, without restriction.

Among the catalysts which have proved to be singularly effective are diaminodiiminosilane, triiminosilane, aminotriethylsilane, hexamethylaminodisilane, diethylamino-trimethylsilane, tetra(diethylamino)silane, phenylamino-trimethylsilane, dicyclohexyldiaminosilane, tributoxyaminosilane, butoxy ethoxydiaminosilane, dimethylaminotriethoxysilane, tetra(diethylaminoethoxy)silane, trimethyl(dimethylaminoethoxy)silane, dimethylaminophenyltriethoxysilane, hexamethylcyclo(triaminosilane), hexabutoxyaminodisilane, N(tetrapyrrol)silane, α-chloroethyldiethylaminosilane, and other halogenated derivatives of the foregoing, and the compositions of the formulas $(RS)_3Si—NH—Si(RS)_3$,

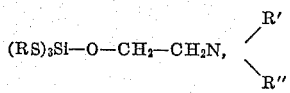

in which R represents alkyl radicals, aryl radicals, alike or different, R' and R" represent hydrogen atoms or alkyl or aryl radicals, alike or different.

All the foregoing catalysts may be used individually or in combination with each other or in combination with catalysts of known types. They may be used in polymerizations in liquid phase or in gas phase, but it is advantageous to carry out the polymerization in liquid phase because the operation is easier and the monomers are purer.

The quantities of catalyst to be used may vary within large limits from 0.0001 to 0.02 mole per 1,000 cc. of solvent when the operation is carried out in liquid phase. When gas phase polymerization is carried out the catalyst is favorably present in the range from 0.01 to 5 moles per 1,000 moles of monomer. Formaldehyde from any source may be used either directly from methanol, or passing through the intermediate stage of hemiformal or, for small installations, by the thermal decomposition of alpha-polyoxymethylene and passage of monomeric formaldehyde through coolers at —20° C., which condenses the water contained in the monomer. It is important to operate in anhydrous medium, that is to say that water should not substantially exceed 1,000 p.p.m. in the monomer during a liquid phase operation and should not substantially exceed 500 p.p.m during vapor phase polymerization.

During polymerization in liquid phase the gaseous monomer is put into a reactor containing the solvent in which the catalyst is dissolved or in suspension. As a solvent one may use any of the hydrocarbon solvents or their mixtures and, in a general fashion, any liquid which is chemically inert to formaldehyde and in which the polymer of formaldehyde is insoluble. In the preferred form of the invention, the proportion of solvent represents at least three times that of the monomer which is to be introduced.

In operations of polymerization in vapor phase the process described in French Patent 1,285,909, filed June 14, 1960, is advantageous. In that process the gaseous monomer, and the catalyst, which may be gaseous or not, are brought together on a bed of finely divided polyformaldehyde.

In both cases the flow of monomer may be adjusted to the value desired either by valves or by controlling the quantity of heat delivered to the pyrolysis of alphapolyoxymethylene. The process of the present invention operates well at atmospheric pressure but it is possible to operate either above or below that pressure. It is easy to determine what conditions of pressure are best by determining the pressure as a function of the vapor tensions of the materials at the temperatures being used.

The temperature of polymerization in liquid phase is generally between —100° C. and +120° C., more advantageously between —80° C. and +70° C., and best between —15° C. and +50° C.

The temperature of polymerization in vapor phase is favorably between —90° C. and +120° C., more advantageously between —20° C. and +100° C., and best between —15° C. and +80° C.

In the operations in liquid phase the catalyst is dissolved or suspended in the liquid reaction medium but in vapor phase the catalyst is preferably introduced as a gas or vapor or, when used in the solid state mixed intimately with the polymer which supplies the surface of reaction.

At the end of the operation the catalyst is eliminated either by washing with an appropriate solvent, for instance the one used to dissolve the catalyst, or during the stabilization of the polyformaldehyde chain-ends by acetylation or etherification, which constitute known procedures which are used after the preparation of formaldehyde polymers, in older processes and which are equally useful in this process.

The polymers which are produced by this process have high molecular weights, are in a narrower range of molecular weights, and are more homogeneous and less frangible. The new polymers are easily stabilized and accept adjuvants such as pigments, antioxidants, plasticizers and stabilizers without degradation.

The following examples illustrate the process without imposing limitations upon the generality of what has been hereinabove stated:

EXAMPLE I

A glass reactor having four parts provided with an agitator, refrigerating means, a thermometer and a source of supply of gaseous formaldehyde received 1,000 cc. of hexane which had been distilled over sodium and 0.5 g. of diethylaminotrimethylsilane as a catalyst. The temperature of the reaction mass was kept at 0° C. throughout the operation. Formaldehyde was formed by the thermal decomposition of alphapolyoxymethylene by a known process and was then passed through a cooling system having a temperature of −20° C. After 4 hours of operation with a yield of 50 g./hr. the flow of monomer was stopped, the reaction medium was decanted, the product was washed with acetone and proved to be 190 g. of a polymer which was insoluble in an aqueous molar solution of sodium sulphite at 20° C. After stabilization by acetylation this product had a constant speed of thermal degradation at 222° C. ($k_{222}$) of 0.2%/min., which is loss of weight per minute calculated on the weight of the residual polymer.

If under the same conditions of operation the new catalyst is replaced by the triethylamine catalyst of the prior art, the polymer obtained has no heat resistance after acetylation.

EXAMPLE II

Operating as in Example I but using 1,000 cc. of anhydrous heptane containing 0.2 g. of dimethylaminotriethoxysilane as catalyst. The current of formaldehyde was bubbled through the solution at room temperature at a rate of 30 g./hr. for 5 hours. After separation and washing with ether there were obtained 150 g. of polymer which was insoluble in an aqueous molar solution of sodium sulphite at 20° C. and which had a $k_{222}$ of 0.12%/min. after stabilization by etherification.

EXAMPLE III

In the same apparatus and under the same conditions as in Example I 0.1 g. of hexabutoxyaminodisilane catalyst were dissolved in 1,000 cc. of petroleum ether. The solution was maintained at room temperature and gaseous monomeric formaldehyde was bubbled through the solution at 80 g./hr. After 5 hours 250 g. of polymer were removed. This was insoluble in a molar aqueous solution of sodium sulphite at 20° C. The polymer was acetylated and was hot pressed to a film about the thickness of photographic film. This was subjected to bending tests in a testing machine and withstood many bendings without damage.

EXAMPLE IV

Operating in the apparatus and by the method of Example I but using anhydrous toluene (1,000 cc.) and 1 g. of hexamethylaminodisilane at −20° C., and bubbling the formaldehyde through the solution at 40 g./hr. for 5 hours, the polymer having been decanted and washed with acetone there were obtained 180 g. of polyformaldehyde insoluble in an aqueous molar solution of sodium sulphite at 20° C. and which, after pressing to the thickness of photographic films, resisted many bendings without damage.

EXAMPLE V

A horizontal metallic cylinder provided with an axial shaft armed with blades operating near the walls and driven at variable speed, received 400 g. of unstabilized polymer as produced in Example IV. The temperature in the reactor was 20° C. and formaldehyde was introduced at a rate of 60 g./hr. The catalyst hexamethylaminodisilane was introduced in a current of dry nitrogen at 0.006 g. of catalyst per hour. The reaction began immediately and after 8 hours the temperature was 50° C. whereupon the supply of formaldehyde was cut off and the product was analyzed. The yield was quantitative. When acetylated the polymer had the same properties as Example IV.

EXAMPLE VI

In the same apparatus as that of Example I 0.2 g. of tetra(diethylaminoethoxy)silane was dissolved in 1,000 cc. of dry hexane. The temperature was maintained at 5° C. and anhydrous formaldehyde was admitted at a rate of 30 g./hr. for 7 hours. After decantation and washing with hexane 200 g. of polymer were recovered of which the solubility in an aqueous molar solution of sodium sulphite at 20° C. was null. After acetylation the $k_{222}$ was 0.15%/min.

EXAMPLE VII

A solution of 0.5 g. of tetra(diethylamino)silane in 1,000 cc. of distilled dibutyl phthalate at a temperature of 0° C. received a current of dry formaldehyde at a rate of 50 g./hr. for 4 hours, the temperature having then reached 20° C. After isolation and washing with acetone, there was a quantitative yield of polymer of which the solubility as aforesaid was null and which, after etherification, was hot pressed to films which resisted the bending test extensively without breaking.

EXAMPLE VIII

Proceeding as in Example I but dissolving the 0.1 g. of trimethyl(dimethylaminoethoxy)silane in 1,000 cc. of butyl orthosilicate, the walls being kept at 0° C., molecular formaldehyde was bubbled through at a rate of 80 g./hr. for 4 hours. After isolation and washing there were 250 g. of polymer insoluble in the sodium sulphite solution at 20° C. and which had a $k_{222}$ of 0.17%/min.

EXAMPLE IX

Operating as in the preceding example but with 1,000 cc. of the solvent known as Decalin and 1 g. of diaminodiimino silane at room temperature and with a flow of 40 g./hr. of formaldehyde for 5 hours. After isolation and washing with ether there were produced 200 g. of polymer which was insoluble according to the solubility test and which had a $k_{222}$ of 0.18%/min.

EXAMPLE X 0.5 g. of triiminodisilane were dissolved in 1,000 cc. of tetralin solvent and 40 g./hr. of anhydrous formaldehyde were bubbled through the solution for 5 hours. After isolation and washing with ether, 180 g. of polymer were obtained which were insoluble by the solubility test and after acetylation was pressed into films which resisted an extensive bending test without breaking.

EXAMPLE XI

Operating as above 1 g. of hexamethylcyclo(triaminosilane) were dissolved in 1,000 cc. of ethyl orthosilicate fresh from distillation. Into this solution at −18° C. a current of formaldehyde monomer was bubbled at 40 g./hr. for 5 hours. After isolation and washing in acetone 200 g. of polymer were recovered which was insoluble in the solubility test and which had a $k_{222}$ of 0.21%/min.

EXAMPLE XII

Into the same apparatus as that of Example V, 3 g. of N(tetrapyrrol)silane were chemically mixed with 400 g. of polyformaldehyde. The temperature of the mass was 20° C. and anhydrous formaldehyde monomer was admitted to the enclosure for 5 hours at a rate of 80 g./hr. The temperature had then risen to 60° C. After washing in ether 800 g. of polymer were obtained which were insoluble by the solubility test and after acetylation had a $k_{222}$ of 0.17%/min.

The process contemplates the polymerization of formaldehyde in the presence of a catalytic quantity of a catalyst having in its molecular structure one or more atoms of silicon and one or more amine groups, amine including imines. The process also contemplates the polymerization in liquid phase in an inert liquid which might be a solvent for the catalyst or a suspension medium, but which is preferably not a solvent for the polymer. The process may also be carried out in vapor phase. When carried out in liquid phase the solvent may well be at least 3 times that of the monomer put into reaction. The amount of catalyst to constitute a catalytic quantity is, when operating in liquid phase between 0.0001 and 0.02 mole per 1,000 cc. of solvent; and when operating in gas phase, between 0.01 and 5 moles per 1,000 moles of monomer. The temperatures employed may range from −100° C. to +120° C., the preferred range in liquid phase being between −15° C. and +50° C. and in gas phase being between −15° C. and +80° C. The catalyst may contain other atoms, for instance oxygen and sulfur. They may also contain aryl and alkyl groups which may bear halogen substituents.

As many apparently widely different embodiments of the present invention may be made without departing from the spirit and scope thereof, it is to be understood that the invention is not limited to the specific embodiments.

What is claimed is:

1. The method of polymerizing formaldehyde which comprises bringing anhydrous formaldehyde into contact with a catalytic quantity of one of the group consisting of the alkyl-, aryl-, cycloaryl-, alkoxy-, aryloxy-, cycloaryloxy-, alkylthio-, arylthio-, cycloarylthio-aminosilanes, the alkyl- and aryl-iminosilanes, the polyalkylpolyaminosilanes, the polycycloarylpolyaminosilanes, and the halogenated derivatives thereof.

2. The method of claim 1 in which the aminosilane in gas phase is mixed with gaseous formaldehyde in a proportion of between 0.01 to 5 moles per 1,000 moles of formaldehyde monomer.

3. The method of claim 1 in which the process is carried out in a solution of formaldehyde in an organic solvent and the aminosilane is present in a proportion of about 0.0001 to 0.02 mole per 1,000 cc. of the solvent.

4. The method of claim 1 in which the process is carried out in gas phase on the surface of finely divided formaldehyde polymer and the quantity of aminosilane is between 0.01 and 5 moles per 1,000 moles of monomeric formaldehyde.

5. The method of claim 1 in which the temperature of the reaction is between about −100° C. and +120° C. at about atmospheric pressure.

6. The method of claim 1 in which the aminosilane is a polyalkylpolyaminosilane.

7. The method of claim 1 in which aminosilane contains at least one nitrogen heterocycle.

8. The method of claim 1 in which the aminosilane has a halogen bearing organic radical.

9. The method of polymerizing formaldehyde which comprises dissolving a catalytic amount of diethylaminotrimethylsilane in hexane at about 0° C., introducing anhydrous formaldehyde to the solution.

10. The method of polymerizing formaldehyde which comprises putting anhydrous formaldehyde into contact with a solution in anhydrous heptane of a catalytic quantity of dimethylaminotriethoxysilane at a temperature about 0° C.

11. A method of polymerizing formaldehyde which comprises passing anhydrous formaldehyde into contact with a catalytic quantity of anhydrous hexabutoxyaminodisilane in petroleum ether solution.

12. A method of making polyformaldehyde which comprises mingling gas phase anhydrous formaldehyde in admixture with inert gas with a catalytic quantity of hexamethylaminodisilane on the surface of finely divided polyformaldehyde at a temperature about 50° C.

13. A method of making polyformaldehyde which comprises bringing mixed formaldehyde and N(tetrapyrrol)silane into contact with finely divided polyformaldehyde at about 20° C., continuing the polymerization with the addition of formaldehyde until the temperature reaches about 60° C., cooling, and acetylating the polymer.

14. The method of polymerizing formaldehyde which comprises bringing anhydrous formaldehyde into contact with a catalytic quantity of an organoaminosilane selected from the group consisting of diaminodiiminosilane, triiminosilane, aminotriethylsilane, hexamethylaminodisilane, diethylaminotrimethylsilane, tetra(diethylamino)silane, phenylaminotrimethylsilane, dicyclohexyldiaminosilane, tributoxyaminosilane, butoxyethoxydiaminosilane, dimethylaminotriethoxysilane, tetra(diethylaminoethoxy)silane, trimethyl(dimethylaminoethoxy)silane, dimethylaminophenyltriethoxysilane, hexamethylcyclo(triaminosilane), hexabutoxyaminodisalane, N(tetrapyrrol)silane, α-chloroethyldiethylaminosilane, and other halogenated derivatives of the foregoing, and the compositions of the formulas $(RC)_3Si-NH-Si(RS)_3$,

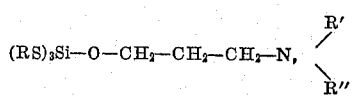

in which R represents alkyl radicals, aryl radicals, alike or different, R' and R" represent hydrogen atoms or alkyl or aryl radicals, alike or different.

References Cited

UNITED STATES PATENTS

| | | | |
|---|---|---|---|
| 2,964,500 | 12/1960 | Jenkins et al. | 260—67 |
| 2,998,409 | 8/1961 | Nogar et al. | 260—67 |
| 3,161,616 | 12/1964 | Brown et al. | 260—67 |
| 3,243,409 | 12/1964 | Kornicker et al. | 260—67 |

FOREIGN PATENTS

| | | |
|---|---|---|
| 1,285,909 | 1/1962 | France. |

OTHER REFERENCES

Kucera et al.: Die Makromolekulare Chemie, vol. 76, pp. 183–189, July 16, 1964,

WILLIAM H. SHORT, *Primary Examiner.*

L. M. PHYNES, *Assistant Examiner.*

UNITED STATES PATENT OFFICE

CERTIFICATE OF CORRECTION

Patent No. 3,337,506                                          August 22, 1967

Francois Meiller

It is hereby certified that error appears in the above numbered patent requiring correction and that the said Letters Patent should read as corrected below.

Column 1, line 39, for "cycloaryl" read -- cyclanyl --; line 43, for "cycloarylpolyaminosilanes" read -- cyclanylpolyaminosilanes --; column 5, line 31, for "cycloaryl-" read -- cyclanyl- --; same column 5, line 34, for "polycycloarylpolyaminosilanes" read -- polycyclanylpolyaminosilanes --.

Signed and sealed this 22nd day of October 1968.

(SEAL)
Attest:

Edward M. Fletcher, Jr.                               EDWARD J. BRENNER

Attesting Officer                                                 Commissioner of Patents